US012068538B2

(12) United States Patent
Wang et al.

(10) Patent No.: US 12,068,538 B2
(45) Date of Patent: Aug. 20, 2024

(54) DUAL MODE ANTENNA STRUCTURES

(71) Applicant: HUAWEI TECHNOLOGIES CO., LTD., Guangdong (CN)

(72) Inventors: Hanyang Wang, Reading (GB); Dawei Zhou, Shenzhen (CN); Yuanpeng Li, Shenzhen (CN); Le Chang, Shenzhen (CN); Hai Zhou, Reading (GB)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 386 days.

(21) Appl. No.: 17/601,552

(22) PCT Filed: May 6, 2019

(86) PCT No.: PCT/EP2019/061564

§ 371 (c)(1),
(2) Date: Oct. 5, 2021

(87) PCT Pub. No.: WO2020/224757

PCT Pub. Date: Nov. 12, 2020

(65) Prior Publication Data

US 2022/0181784 A1 Jun. 9, 2022

(51) Int. Cl.
*H01Q 13/10* (2006.01)
*H01Q 1/24* (2006.01)
(Continued)

(52) U.S. Cl.
CPC ............. *H01Q 13/10* (2013.01); *H01Q 1/243* (2013.01); *H01Q 1/521* (2013.01); *H01Q 9/26* (2013.01); *H01Q 21/28* (2013.01)

(58) Field of Classification Search
CPC ........ H01Q 1/243; H01Q 1/521; H01Q 13/10; H01Q 21/28; H01Q 9/16; H01Q 9/26; H01Q 1/36; H01Q 1/50; H01Q 1/52
See application file for complete search history.

(56) References Cited

U.S. PATENT DOCUMENTS 4,839,663 A 6/1989 Kurtz
2007/0156312 A1* 7/2007 Breed ................ B60C 23/0408
701/31.4
(Continued)

FOREIGN PATENT DOCUMENTS

CN 101872897 A 10/2010
CN 102570058 A 7/2012
(Continued)

OTHER PUBLICATIONS

Hang Xu et al, A Highly Integrated MIMO Antenna Unit: Differential and Common Mode Design, IEEE Transactions on Antennas and Propagation, vol. 67, No. 11, Nov. 2019, 11 pages.
(Continued)

*Primary Examiner* — Thien M Le
(74) *Attorney, Agent, or Firm* — WOMBLE BOND DICKINSON (US) LLP

(57) ABSTRACT

An antenna structure includes a first antenna element connected to a first port, and a second antenna element connected to a second port. The antenna structure is operable to simultaneously transceive: a first signal via electric or magnetic current flow through the first antenna element in a symmetrically excited mode in which current flows symmetrically through the first antenna element and/or an asymmetrically excited mode in which current flows asymmetrically through the first antenna element, the first antenna element resonates at a first resonant frequency; and a second signal via electric or magnetic current flow through the second antenna element in a symmetrically excited mode in which current flows symmetrically through the second antenna element and/or an asymmetrically excited mode in which current flows asymmetrically through the second antenna element, the second antenna element resonates at a second resonant frequency.

19 Claims, 11 Drawing Sheets

(51) Int. Cl.

| | |
|---|---|
| ***H01Q 1/52*** | (2006.01) |
| ***H01Q 9/26*** | (2006.01) |
| ***H01Q 21/28*** | (2006.01) |

(56) References Cited

U.S. PATENT DOCUMENTS

| | | | | |
|---|---|---|---|---|
| 2007/0156320 | A1* | 7/2007 | Breed | B60C 23/0433 701/70 |
| 2008/0198082 | A1* | 8/2008 | Soler Castany | H01Q 1/38 343/893 |
| 2008/0216567 | A1* | 9/2008 | Breed | B60R 21/013 73/146.5 |
| 2009/0121947 | A1* | 5/2009 | Nysen | H01Q 21/24 343/702 |
| 2009/0122847 | A1* | 5/2009 | Nysen | H01Q 1/2275 375/222 |
| 2009/0262028 | A1* | 10/2009 | Mumbru | H01Q 5/371 343/702 |
| 2010/0302112 | A1 | 12/2010 | Lindenmeier et al. | |
| 2013/0078935 | A1* | 3/2013 | Nysen | H01Q 21/28 343/730 |
| 2014/0091981 | A1* | 4/2014 | Komulainen | H01Q 9/04 343/893 |
| 2019/0140358 | A1* | 5/2019 | Antonetti | H01Q 19/00 |
| 2021/0234254 | A1* | 7/2021 | Dai | H01Q 13/10 |

FOREIGN PATENT DOCUMENTS

| | | | |
|---|---|---|---|
| CN | 106340711 | A | 1/2017 |
| CN | 107925430 | A | 4/2018 |
| CN | 108470979 | A | 8/2018 |
| WO | 2018077408 | A1 | 5/2018 |
| WO | 2020010636 | A1 | 1/2020 |
| WO | 2020173540 | A1 | 9/2020 |
| WO | 2020224757 | A1 | 11/2020 |

OTHER PUBLICATIONS

Wen-Ao Li et al, Differential Stepped-Slot UWB Antenna With Common-Mode Suppression and Dual Sharp-Selectivity Notched Bands, IEEE Antennas and Wireless Propagation Letters ( vol. 15), 2016, 4 pages.

* cited by examiner (a) Wire CM: Vertical Polarization (c) Slot CM: Horizontal Polarization (b) Wire DM: Horizontal Polarization (d) Slot DM: Vertical Polarization (a) Wire CM (c) Slot CM (b) Wire DM (d) Slot DM

DUAL MODE ANTENNA STRUCTURES

This application is a National Stage of International Patent Application No. PCT/EP2019/061564, filed on May 6, 2019, which is hereby incorporated by reference in its entirety.

FIELD OF THE DISCLOSURE

This disclosure relates to antenna structures, and in particular to providing a compact antenna structure capable of operating in more than one mode.

BACKGROUND

An antenna is a transducer that converts radio frequency electric current to electromagnetic waves that are radiated into space in order to transmit a signal, and that also converts electromagnetic waves from space into radio frequency electric current in order to receive a signal.

Portable handheld units, such as mobile phones and tablets, may transmit and receive signals at different frequencies. For example, a mobile phone may transceive cellular signals at 1.8 GHz, and Bluetooth signals at 2.45 GHz.

It is known to provide antenna structures in which two separate antenna elements are collocated: one for transceiving at a first frequency, and the other for transceiving at a second frequency. To be able to transceive signals of both the first and second frequencies at the same time, the antenna elements are typically physically spaced. The physical separation reduces the overlap in the radiation patterns they generate, thereby aiding isolation of the antenna elements from each other. Additionally, frequency filters can be incorporated into the antenna structure to further isolate the signals transceived at the antenna elements.

Many products into which antennas are integrated, for example mobile phones and tablets, have many internal components, all of which need to fit within a limited overall volume. It is therefore desirable to minimize the volume dedicated to each internal component, without losing performance of that component. Thus, it is desirable to provide an antenna structure having two resonances which is compact whilst maintaining sufficient isolation so as to enable signals at both resonant frequencies to be transceived at the same time.

SUMMARY OF THE DISCLOSURE

In an embodiment, an antenna structure is provided. The antenna structure includes a first antenna element connected to a first port; and a second antenna element connected to a second port; the antenna structure being operable to simultaneously transceive: a first signal via electric or magnetic current flow through the first antenna element to or from the first port in a symmetrically excited mode in which current flows symmetrically through the first antenna element and/or an asymmetrically excited mode in which current flows asymmetrically through the first antenna element, thereby causing the first antenna element to resonate at a first resonant frequency; and a second signal via electric or magnetic current flow through the second antenna element to or from the second port in a symmetrically excited mode in which current flows symmetrically through the second antenna element and/or an asymmetrically excited mode in which current flows asymmetrically through the second antenna element, thereby causing the second antenna element to resonate at a second resonant frequency. This is a compact antenna structure which is able to transceive on two frequencies at the same time whilst exhibiting high isolation.

The first resonant frequency may be the same as the second resonant frequency. Thus, the antenna structure is able to transceive two signals having the same frequency at the same time, whilst maintaining high isolation.

The first antenna element may be a one-dimensional antenna element, and the second antenna element may be a one-dimensional antenna element. Thus, the antenna structure may be implemented with, for example, wire antenna elements and/or slot antenna elements.

The first antenna element may be operable in a symmetrically excited mode in which it emits a field polarised in a first direction to transceive the first signal, and the second antenna element may be operable in an asymmetrical excited mode in which it emits a field polarised in a second direction orthogonal to the first direction to transceive the second signal. These orthogonal field directions lead to high isolation.

The first antenna element may be operable in a symmetrically excited mode in which it emits a field polarised in a first direction to transceive the first signal, and the second antenna element may be operable in a symmetrical excited mode in which it emits a field polarised in a second direction orthogonal to the first direction to transceive the second signal. These orthogonal field directions lead to high isolation.

The first antenna element may be operable in an asymmetrically excited mode in which it emits a field polarised in a first direction to transceive the first signal, and the second antenna element may be operable in an asymmetrical excited mode in which it emits a field polarised in a second direction orthogonal to the first direction to transceive the second signal. These orthogonal field directions lead to high isolation.

The first antenna element may be a wire antenna element, and the second antenna element may be a wire antenna element. This is a compact layout.

The first antenna element may be a slot antenna element, and the second antenna element may be a slot antenna element. This is a compact layout.

The first antenna element may be a wire antenna element, and the second antenna element may be a slot antenna element. This is a compact layout.

The first antenna element may be a slot antenna element, and the second antenna element may be a wire antenna element. This is a compact layout.

The first antenna element may have a central axis and the second antenna element may have a central axis, the antenna structure being arranged such that the central axis of the first antenna element is aligned with the central axis of the second antenna element. This aligning of the central axes aids in generating generally uniform radiation patterns at the resonant frequencies.

The first antenna element may have a central axis and the second antenna element may have a central axis, the antenna structure being arranged such that the central axis of the first antenna element is offset from the central axis of the second antenna element. An offset alignment may aid fitting the antenna structure around other components.

The first antenna element may be in the same orientation as the second antenna element. This aids high isolation between the antenna elements for some configurations and modes of the antenna elements.

The first antenna element may be in an orthogonal orientation to the second antenna element. This aids high isolation between the antenna elements for some configurations and modes of the antenna elements.

In an embodiment, a method of operating an antenna structure is provided. The method includes a first antenna element connected to a first port, and a second antenna element connected to a second port, the method comprising: simultaneously transceiving: a first signal via electric or magnetic current flow through the first antenna element to or from the first port in a symmetrically excited mode in which current flows symmetrically through the first antenna element and/or an asymmetrically excited mode in which current flows asymmetrically through the first antenna element, thereby causing the first antenna element to resonate at a first resonant frequency; and a second signal via electric or magnetic current flow through the second antenna element to or from the second port in a symmetrically excited mode in which current flows symmetrically through the second antenna element and/or an asymmetrically excited mode in which current flows asymmetrically through the second antenna element, thereby causing the second antenna element to resonate at a second resonant frequency. This method enables a compact antenna structure to transceive on two frequencies at the same time whilst exhibiting high isolation.

BRIEF DESCRIPTION OF THE FIGURES

Embodiments will now be described by way of example with reference to the accompanying drawings. In the drawings.

DETAILED DESCRIPTION

Figure 1:
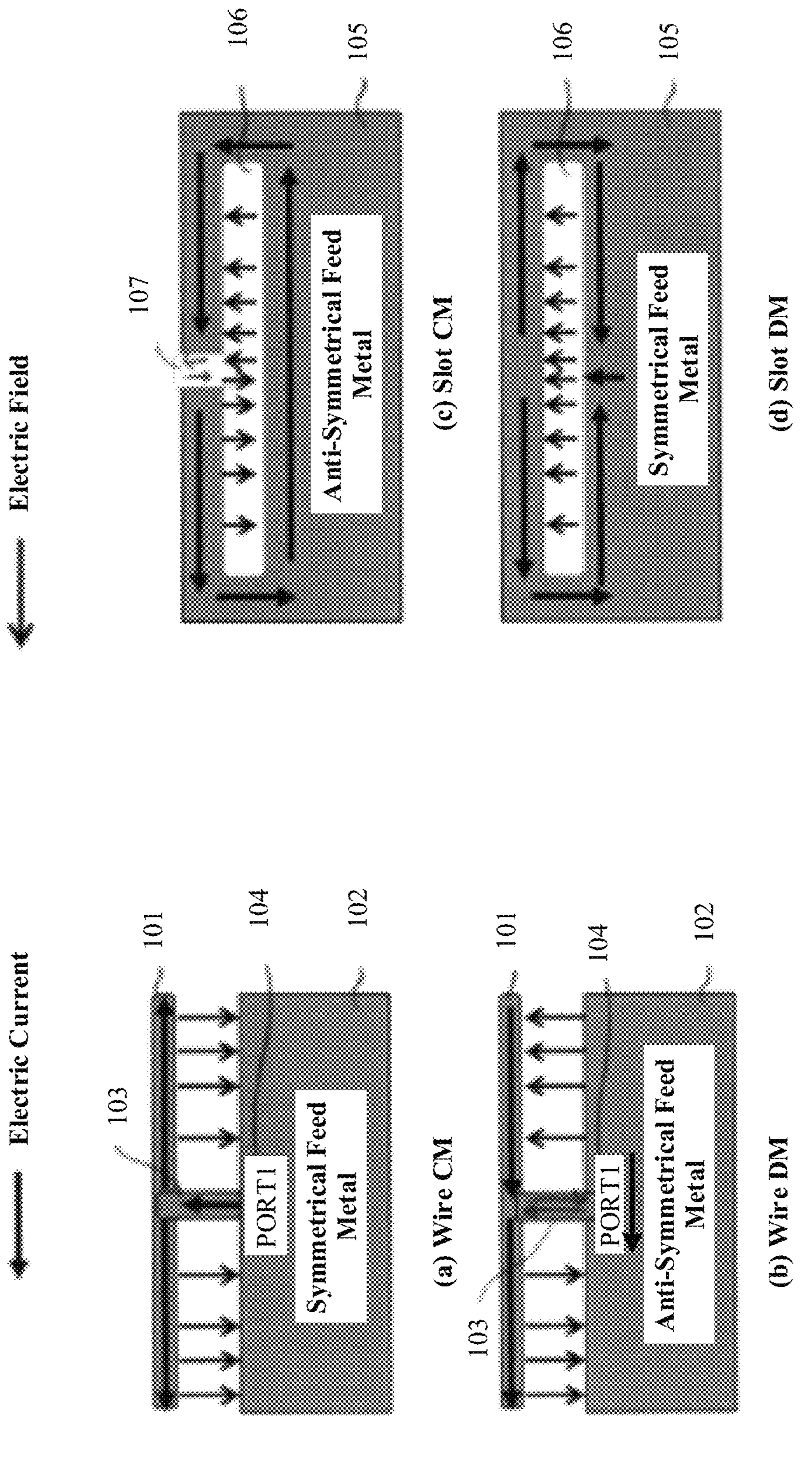
FIG. 1 illustrates unit antenna elements in accordance with an embodiment.

Reference to "one embodiment", "an embodiment", "in accordance with an embodiment" or "one or more embodiments" indicate that a particular feature, structure, or characteristic described in conjunction with the embodiment can be included in at least one embodiment disclosed herein. The appearances of the phrase "in an embodiment" and "in accordance with an embodiment" in various places in the specification do not necessarily refer to the same embodiment.

Embodiments disclosed herein may provide several antenna structures, each having a pair of antenna elements. The structure of the antenna elements, their relative locations, and the modes they operate in are arranged such that they exhibit high isolation with respect to each other. Thus, each antenna element in the pair is able to transceive a signal at the same time as the other antenna element transceiver a signal.

In an embodiment, the antenna elements may be unit antenna elements. That is, they are one-dimensional antenna elements. Wire antenna elements and slot antenna elements are, in an embodiment, unit antenna elements described herein.

FIGS. 1*a* and 1*b* each illustrate a wire antenna element in accordance with an embodiment. Wire antenna element 101 is connected to ground plane 102 via feedline 103 and port 104. Wire antenna element 101 is elongate and linear. FIGS. 1*a* and 1*b* illustrate a single feedline 103 connecting port 104 to antenna element 101. The feedline 103 is connected to the centre of the antenna element 101. The feedline 103 extends perpendicularly to the main extent of the antenna element 101. Both these features aid in generating a generally uniform radiation pattern at resonance when current is fed into the antenna element. In addition to feedline 103, further feedlines may connect port 104 to antenna element 101. These further feedlines are connected to the antenna element 101 in a symmetrical arrangement. This symmetry aids in uniformly applying current to the antenna element, and hence in generating a uniform radiation pattern at resonance. The further feedlines may extend perpendicularly to the main extent of the antenna element 101. Alternatively, the further feedlines may extend at a non-perpendicular angle to the main extent of the antenna element 101.

The wire antenna element of FIG. 1*a* is shown as acting in a Common Mode (CM). Electric current is fed symmetrically through feedline 103. From where the feedline 103 meets the antenna element 101, the current flows symmetrically in both directions through the antenna element away from the feedline. The antenna element thereby resonates at a resonant frequency. The excited electric field resulting from the current flow is uni-directional from each edge of the antenna element. The electric field lines are perpendicular to the longitudinal extent of the wire element 101. The electric field lines from the side of the antenna element facing the ground plane all point in the same direction from the antenna element 101 to the ground plane 102. As is shown in FIG. 2*a* in an embodiment, the electric field lines from the opposing side of the antenna element 101 all point in the same direction away from the antenna element 101. The CM wire antenna element thus has a radiation pattern polarised in one linear direction. In FIG. 2*a*, this is shown as a vertically polarised radiation pattern.

The wire antenna element of FIG. 1*b* is shown as acting in a Differential Mode (DM) in an embodiment. Electric current is fed asymmetrically through feedline 103. Current on the antenna element 101 flows asymmetrically. Specifically, current on the antenna element all flows in the same direction. The antenna element thereby resonates at a resonant frequency. The excited electric field resulting from the current flow is bi-directional from each edge of the antenna element. The electric field lines are perpendicular to the longitudinal extent of the wire element 101. The electric field lines from the side of the antenna element facing the ground plane on one side of the feedline 103 point towards the antenna element 101 from the ground plane 102. As can be seen in FIG. 2*b*, the electric field lines from the opposing side of the antenna element on the same side of the feedline 103 point in the same direction, i.e. away from the antenna element 101, in an embodiment. The electric field lines from the side of the antenna element facing the ground plane on the other side of the feedline 103 point away from the antenna element 101 towards the ground plane 102. As can be seen in FIG. 2*b*, the electric field lines from the opposing side of the antenna element on the same side of the feedline 103 point in the same direction, i.e. towards the ground plane, in an embodiment. The DM wire antenna element thus has a radiation pattern polarised in an orthogonal direction to the CM wire antenna element's radiation pattern. In FIG. 2*b*, this is shown as a horizontally polarised radiation pattern.

FIGS. 1*c* and 1*d* each illustrate a slot antenna element in accordance with an embodiment. Slot antenna element 105 includes a slot 106. Slot 106 is elongate and linear. In the example shown, opposing sides of the slot are parallel, and adjacent sides of the slot are perpendicular. Current is fed into the slot antenna element at the centre of the antenna element. Current is fed into the slot antenna element in a direction perpendicular to the main extent of the antenna element 105. These features aid in generating a generally uniform radiation pattern at resonance when current is fed into the structure.

The slot antenna element of FIG. 1*c* is shown as acting in a Common Mode (CM) in an embodiment. Electric current is fed asymmetrically through feedline 107. Electric current circumscribes the slot 106 in a single direction, either clockwise or anticlockwise. The antenna element thereby resonates at a resonant frequency. The excited electric field resulting from the current flow is bi-directional in the slot. The electric field lines in the slot 106 are perpendicular to the longitudinal extent of the slot. The electric field lines on one side of the feedline 107 point in one direction perpendicular to the longitudinal extent of the slot, and the electric field lines on the other side of the feedline 107 point in an opposing direction perpendicular to the longitudinal extent of the slot. FIG. 2*c* illustrates the electric field pattern surrounding the antenna element in accordance with an embodiment. This pattern is similar to that for a DM wire antenna element. The CM slot antenna element has a radiation pattern polarised in an orthogonal direction to the DM slot antenna element. In FIG. 2*c*, this is shown as a horizontally polarised radiation pattern.

The slot antenna element of FIG. 1*d* is shown as acting in a Differential Mode (DM) in accordance with an embodiment. Electric current is fed symmetrically into the centre of the antenna element 105. Electric current circumscribes the slot 106 bi-directionally. From where the current meets the slot 106, current flows symmetrically in both directions around the slot 106. The antenna element thereby resonates at a resonant frequency. The excited electric field resulting from the current flow is uni-directional in the slot. The electric field lines in the slot 106 are perpendicular to the longitudinal extent of the slot. The electric field lines all point in the same direction in the slot. FIG. 2*d* illustrates the electric field pattern surrounding the antenna element in accordance with an embodiment. This pattern is similar to that for a CM wire antenna element. The DM slot antenna element has a radiation pattern polarised in one linear direction which is orthogonal to the direction of polarisation of the CM slot antenna element. In FIG. 2*d*, this is shown as a vertically polarised radiation pattern.

Figure 2:
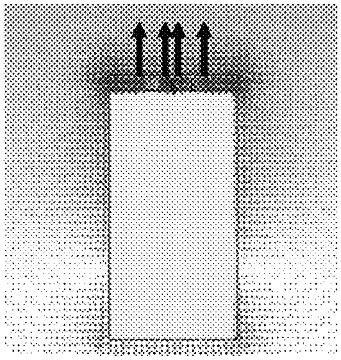
FIG. 2 illustrates electric field patterns of the antenna elements of FIG. 1 in accordance with an embodiment.
Figure 2:
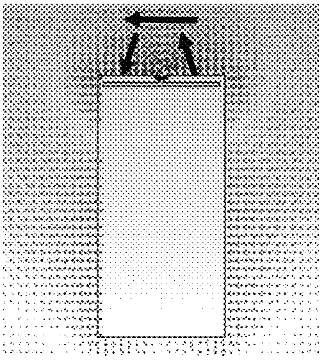
Figure 2:
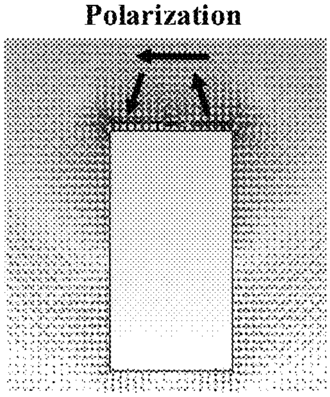
Figure 2:
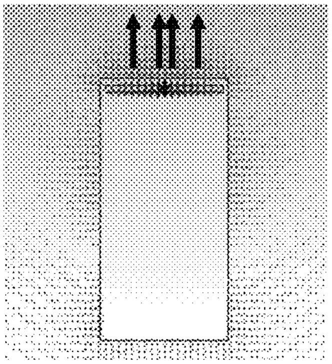
Figure 3:
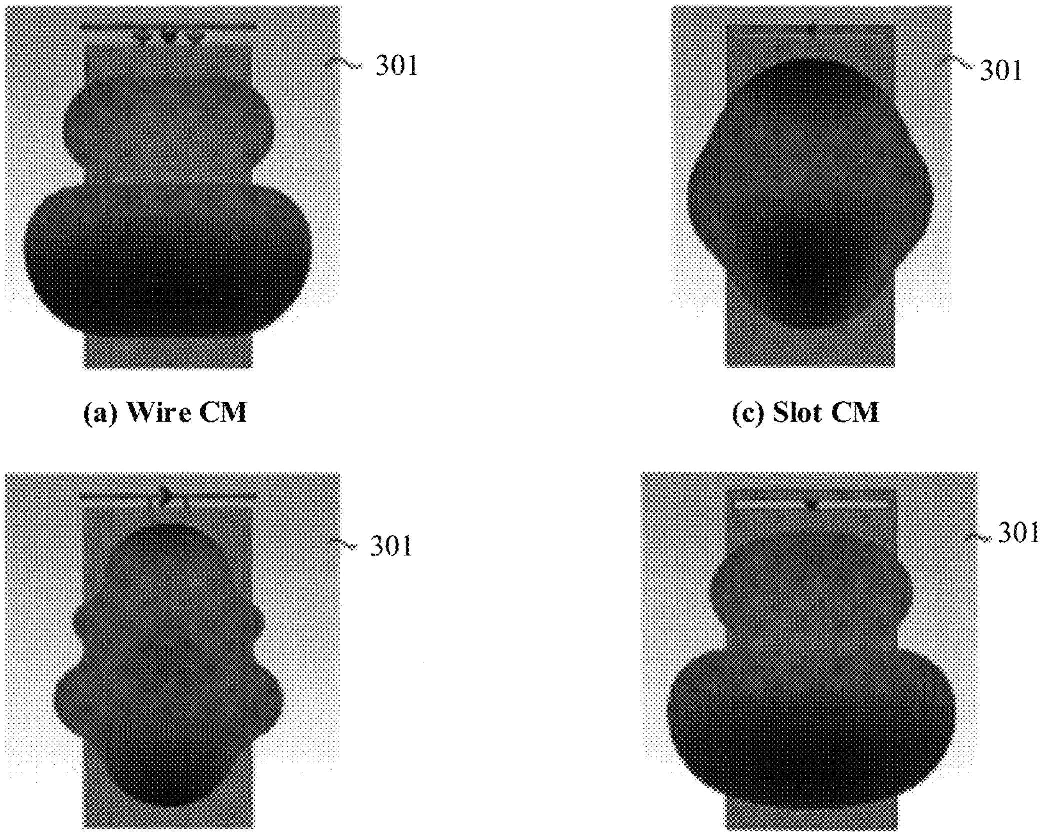
FIG. 3 illustrates radiation patterns of the unit antenna elements of FIG. 1 when placed at the narrow side of a Printed Circuit Board (PCB) in accordance with an embodiment.
Figure 4:
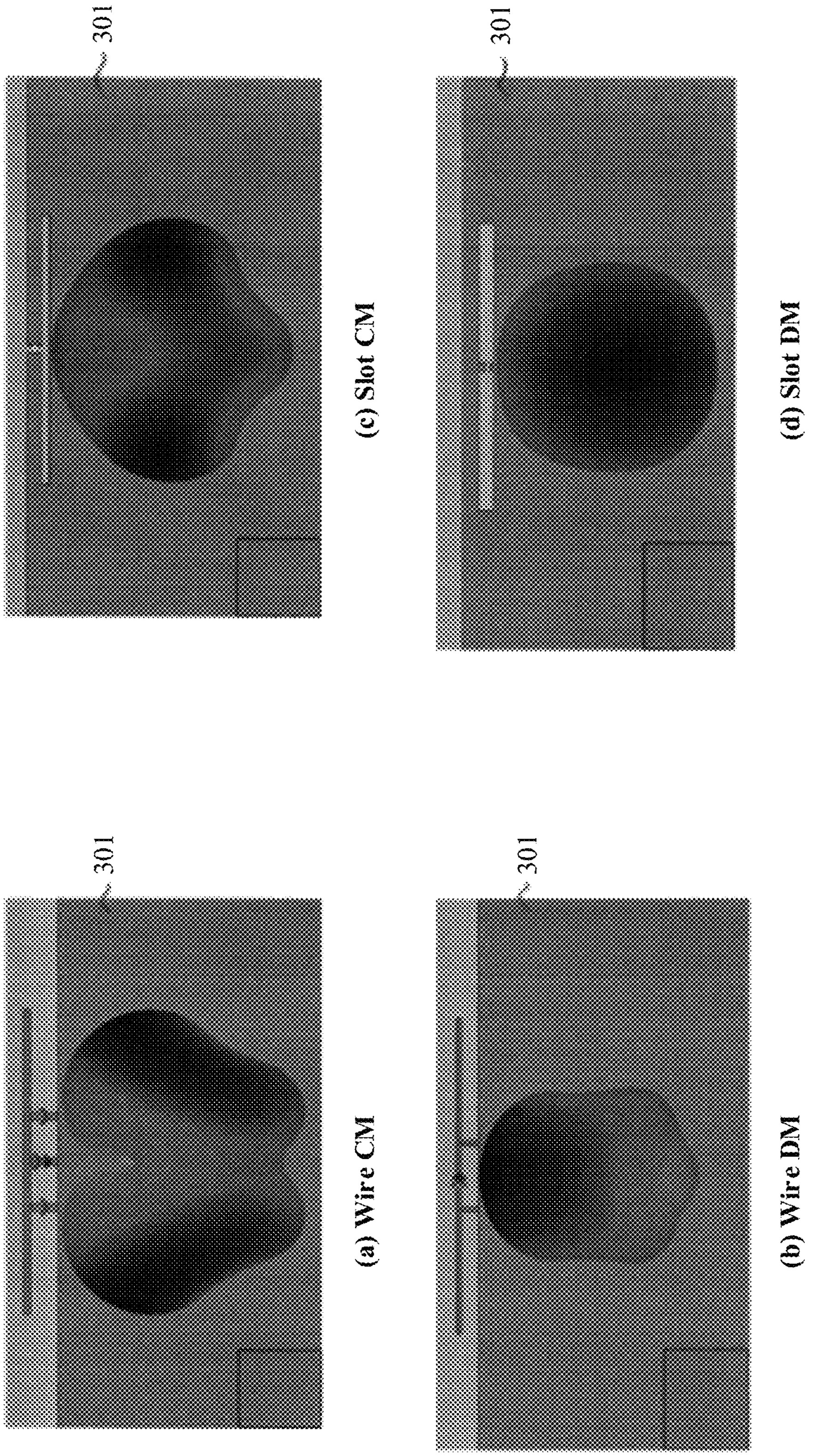
FIG. 4 illustrates radiation patterns of the unit antenna elements of FIG. 1 when placed at the wide side of a PCB in accordance with an embodiment.

FIGS. 3 and 4 illustrate the radiation patterns of the antenna elements of FIG. 1 when they are placed on a Printed Circuit Board (PCB) in accordance with an embodiment. FIG. 3 illustrates the radiation pattern of each antenna element when it is placed along one of the shorter sides of the PCB. FIG. 4 illustrates the radiation pattern of each antenna element when it is placed along one of the longer sides of the PCB. In FIGS. 3*a*, 3*b*, 4*a* and 4*b*, a wire antenna element is located external to the PCB. In FIGS. 3*c*, 3*d*, 4*c* and 4*d*, a slot antenna element is located inside the boundary of the PCB. These figures show that the radiation pattern of a CM wire antenna element and a DM wire antenna element are to some extent complementary. Similarly, the radiation pattern of a CM slot antenna element and a DM slot antenna element are to some extent complementary.

Figure 5:
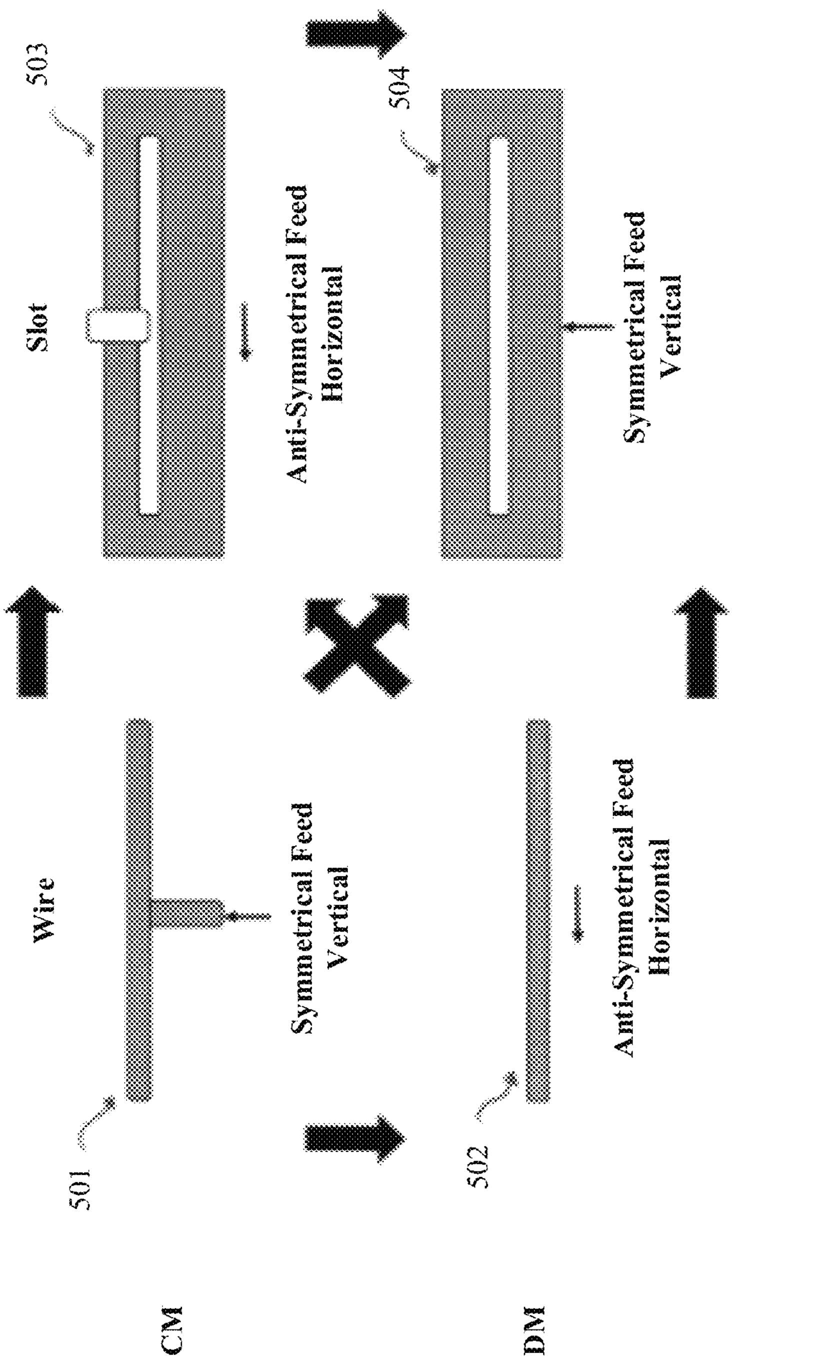
FIG. 5 illustrates antenna elements in accordance with an embodiment.

The following describes several antenna structures, each having a pair of antenna elements. FIG. 5 illustrates antenna elements, each of which may be combined into an antenna structure in accordance with an embodiment. Each of the following described antenna structures has a first antenna element connected to a first port, and a second antenna element connected to a second port. Current flows through the first antenna element to or from the first port thereby causing the first antenna element to resonate at a first resonant frequency. Current flows through the second antenna element to or from the second port thereby causing the second antenna element to resonate at a second resonant frequency. Each antenna element operates in either a symmetrically excited mode in which current flows symmetrically through the antenna element, or in an asymmetrically excited mode in which current flows asymmetrically through the antenna element.

For each antenna structure, the combination of antenna elements, the relative orientations of the antenna elements, and the mode each antenna element is operating in is such that the pair of antenna elements have radiation patterns polarised in orthogonal directions. This polarisation diversity results in a low Envelope Correlation Coefficient (ECC) when both antenna elements are simultaneously transceiving. Thus, each antenna structure demonstrates high isolation between its constituent antenna elements. The radiation patterns of the antenna elements in each antenna structure are to an extent complementary which aids the isolation. Each antenna structure is thereby able to simultaneously transceive a first signal via the first antenna element and a second signal via the second antenna element. In other words, the antenna structure can: (i) transmit a first signal by the first antenna element and a second signal by the second antenna element at the same time, or (ii) receive a first signal by the first antenna element and a second signal by the second antenna element at the same time, or (iii) transmit a first signal by the first antenna and receive a second signal by the second antenna at the same time, or (iv) receive a first signal by the first antenna and transmit a second signal by the second antenna at the same time.

The resonant frequency of the first antenna element may be different to the resonant frequency of the second antenna element. However, the resonant frequency of the first antenna element may be the same as the resonant frequency of the second antenna element. Thus, even though the antenna elements are physically located in close proximity, they are sufficiently isolated that they are able to transmit and receive different signals at the same frequency at the same time.

In the following first set of example antenna structures, the first antenna element of the pair operates in a symmetrically excited mode in which current flows symmetrically through the first antenna element, and the second antenna element of the pair operates in an asymmetrically excited mode in which current flows asymmetrically through the second antenna element.

Figure 6:
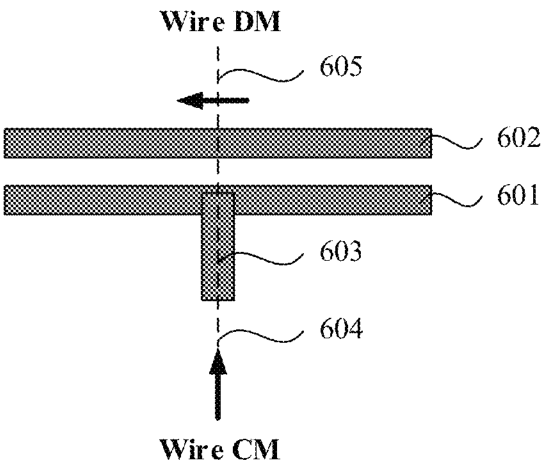
FIG. 6 illustrates an antenna structure includes a Common Mode (CM) wire antenna element and a Differential Mode (DM) wire antenna element pair in accordance with an embodiment.

The first example antenna structure of this first set is illustrated in FIG. 5 as the combination of the CM wire antenna element 501 and the DM wire antenna element 502 in accordance with an embodiment. This antenna structure is shown in FIG. 6 in accordance with an embodiment. The first antenna element is a CM wire antenna element 601 which is fed symmetrically through feedline 603. The second antenna element is a DM wire antenna element 602 which is fed asymmetrically. The first antenna element is in the same orientation as the second antenna element. In other words, their longitudinal axes are parallel. Thus, the radiation patterns of the first and second antenna elements are polarised in orthogonal directions.

Suitably, the first antenna element 601 is aligned with the second antenna element 602. The first antenna element 601 has a central axis 604. The second antenna element 602 has a central axis 605. The central axis 604 of the first antenna element 601 is aligned with the central axis 605 of the second antenna element 602. The central axis of each antenna element may bisect that antenna element. In FIG. 6, the central axis of each antenna element is perpendicular to the longitudinal axis of the antenna element. The antenna element may be symmetrical about its central axis. In particular, the central axis may be an axis of reflection for the antenna element. The first and second antenna elements may have the same longitudinal extent. Thus, as well as the central axes of the antenna elements being aligned, the ends of the antenna elements may be aligned.

Figure 7:
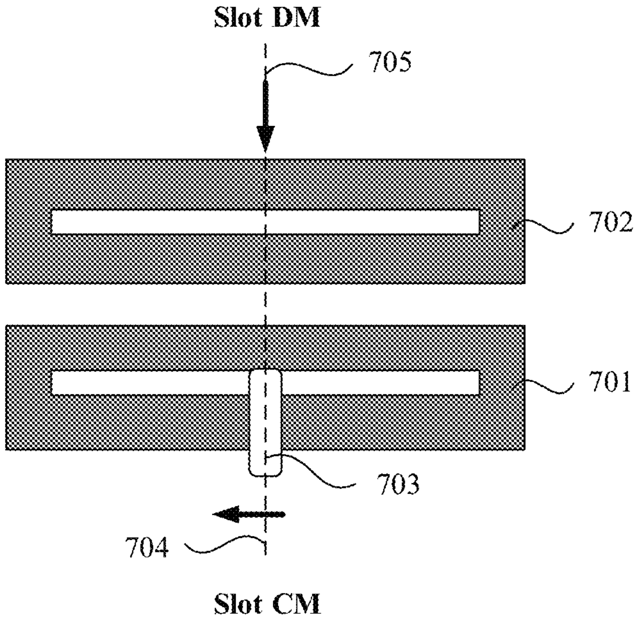
FIG. 7 illustrates an antenna structure includes a CM slot antenna element and a DM slot antenna element pair in accordance with an embodiment.

The second example antenna structure of this first set is illustrated in FIG. 5 as the combination of the CM slot antenna element 503 and the DM slot antenna element 504. This antenna structure in accordance with an embodiment is shown in FIG. 7. The first antenna element is CM slot antenna element 701 which is fed asymmetrically through feedline 703. The second antenna element is DM slot antenna element 702 which is fed symmetrically. The first antenna element is in the same orientation as the second antenna element. In other words, their longitudinal axes are parallel. Thus, the radiation patterns of the first and second antenna elements are polarised in orthogonal directions.

Suitably, the first antenna element 701 is aligned with the second antenna element 702. The first antenna element 701 has a central axis 704. The second antenna element 702 has a central axis 705. The central axis 704 of the first antenna element 701 is aligned with the central axis 705 of the second antenna element 702. The central axis of each antenna element may bisect that antenna element. In FIG. 7, the central axis of each antenna element is perpendicular to the longitudinal axis of the antenna element. The antenna element may be symmetrical about its central axis. In particular, the central axis may be an axis of reflection for the antenna element. The first and second antenna elements may have the same longitudinal extent. Thus, as well as the central axes of the antenna elements being aligned, the ends of the antenna elements may be aligned.

Figure 8:
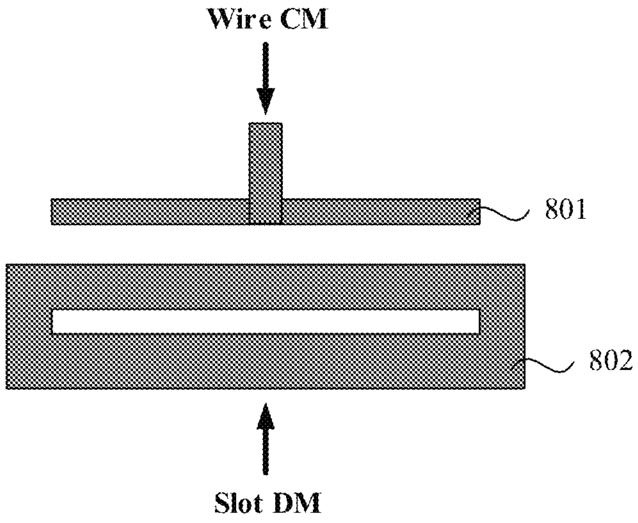
FIGS. 8 and 9 illustrate antenna structures includes a CM wire antenna element and a DM slot antenna element pair in accordance with an embodiment.
Figure 9:
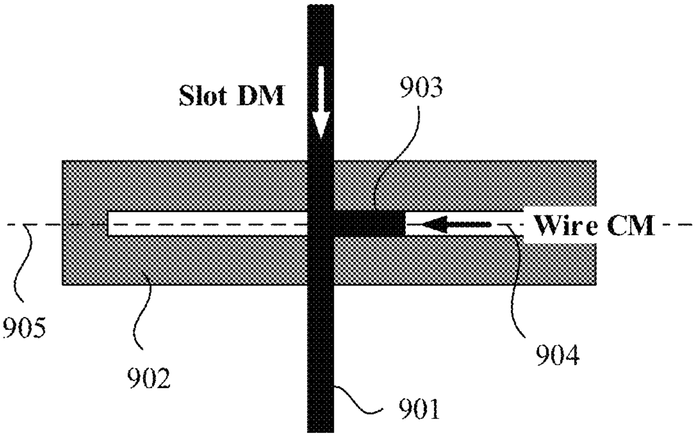

FIG. 8 illustrates an antenna structure including a CM wire antenna element 801 and a DM slot antenna element 802 in accordance with an embodiment. In FIG. 8, these two antenna elements are in the same orientation. In this configuration, both antenna elements are polarised in the same direction, thus are poorly isolated from one another. Thus, an antenna structure including the antenna element configuration of FIG. 8 is not suitable for simultaneously transceiving signals via both antenna elements. FIG. 9 illustrates a third example antenna structure of the first set which is suitable for simultaneously transceiving signals via both antenna elements in accordance with an embodiment. In this example, the CM wire antenna element 901 has been rotated by 90° relative to the CM wire antenna element 801 in FIG. 8. The result is that the CM wire antenna element 901 is in an orthogonal orientation to the DM slot antenna element 902. Thus, the radiation patterns of the first and second antenna elements are polarised in orthogonal directions.

Suitably, the first antenna element 901 has a central axis 904, and the second antenna element 902 has a central axis 905. The central axis 904 of the first antenna element 901 is aligned with the central axis 905 of the second antenna element 902. The central axis of each antenna element may bisect that antenna element. In FIG. 9, the central axis of the CM wire antenna element is perpendicular to the longitudinal axis of the CM wire antenna element. However, the central axis of the DM slot antenna element is parallel to the longitudinal axis of the DM slot antenna element. Each antenna element may be symmetrical about its central axis. In particular, the central axis may be an axis of reflection for the antenna element.

Figure 10:
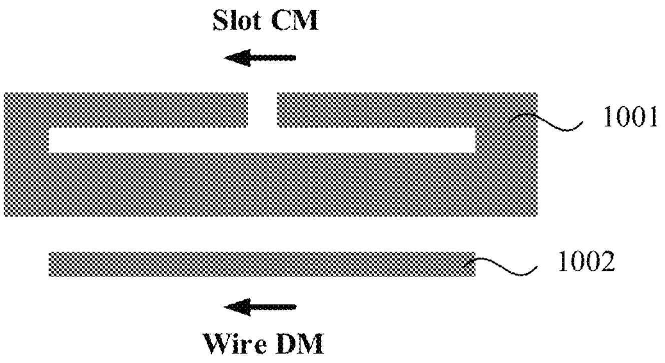
FIGS. 10 and 11 illustrate antenna structures includes a CM slot antenna element and a DM wire antenna element pair in accordance with an embodiment.
Figure 11:
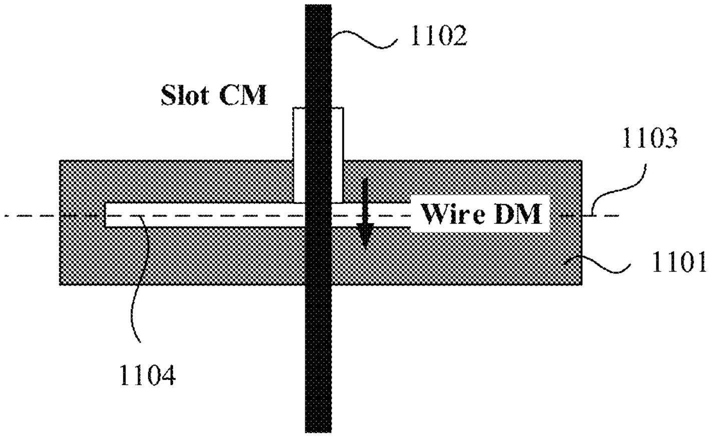

FIG. 10 illustrates an antenna structure including a CM slot antenna element 1001 and a DM wire antenna element 1002 in accordance with an embodiment. In FIG. 10, these two antenna elements are in the same orientation. In this configuration, both antenna elements are polarised in the same direction, thus are poorly isolated from one another. Thus, an antenna structure including the antenna element configuration of FIG. 10 is not suitable for simultaneously transceiving signals via both antenna elements. FIG. 11 illustrates a fourth example antenna structure of the first set which is suitable for simultaneously transceiving signals via both antenna elements in accordance with an embodiment. In this example, the DM wire antenna element 1102 has been rotated by 90° relative to the DM wire antenna element 1002 in FIG. 10. The result is that the DM wire antenna element 1102 is in an orthogonal orientation to the CM slot antenna element 1101. Thus, the radiation patterns of the first and second antenna elements are polarised in orthogonal directions.

Suitably, the first antenna element 1101 has a central axis 1103, and the second antenna element 1102 has a central axis 1104. The central axis 1103 of the first antenna element 1101 is aligned with the central axis 1104 of the second antenna element 1102. The central axis of each antenna element may bisect that antenna element. In FIG. 11, the central axis of the DM wire antenna element is perpendicular to the longitudinal axis of the DM wire antenna element. However, the central axis of the CM slot antenna element is parallel to the longitudinal axis of the CM slot antenna element. Each antenna element may be symmetrical about its central axis. In particular, the central axis may be an axis of reflection for the antenna element.

In the following second set of example antenna structures, the first and second antenna elements both operate in a symmetrically excited mode in which current flows symmetrically through the antenna element.

Figure 12:
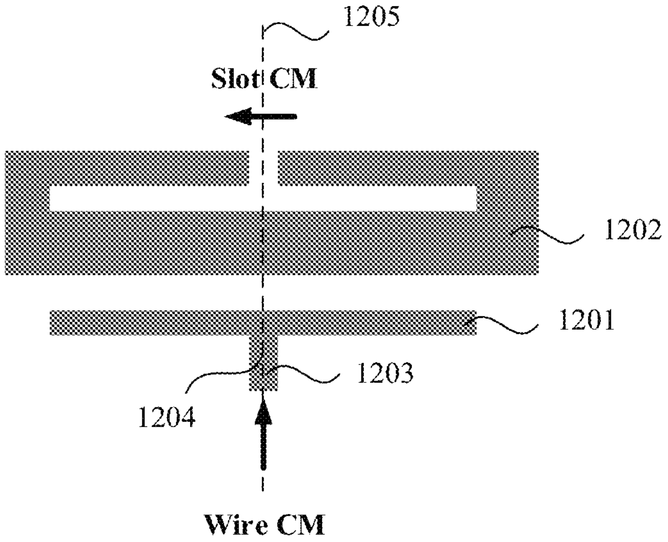
FIG. 12 illustrates an antenna structure includes a CM wire antenna element and a CM slot antenna element pair in accordance with an embodiment.

An example antenna structure of the second set is illustrated in FIG. 5 as the combination of the CM wire antenna element 501 and the CM slot antenna element 503. This antenna structure in accordance with an embodiment is shown in FIG. 12. The first antenna element is a CM wire antenna element 1201 which is fed symmetrically through feedline 1203. The second antenna element is a CM slot antenna element 1202 which is fed asymmetrically. The first antenna element is in the same orientation as the second antenna element. In other words, their longitudinal axes are parallel. Thus, the radiation patterns of the first and second antenna elements are polarised in orthogonal directions.

Suitably, the first antenna element 1201 is aligned with the second antenna element 1202. The first antenna element 1201 has a central axis 1204. The second antenna element 1202 has a central axis 1205. The central axis 1204 of the first antenna element 1201 is aligned with the central axis 1205 of the second antenna element 1202. The central axis of each antenna element may bisect that antenna element. In FIG. 12, the central axis of each antenna element is perpendicular to the longitudinal axis of that antenna element. The antenna element may be symmetrical about its central axis. In particular, the central axis may be an axis of reflection for the antenna element. The first and second antenna elements may have the same longitudinal extent. Thus, as well as the central axes of the antenna elements being aligned, the ends of the antenna elements may be aligned.

In the following third set of example antenna structures, the first and second antenna elements both operate in an asymmetrically excited mode in which current flows asymmetrically through the antenna element.

Figure 13:
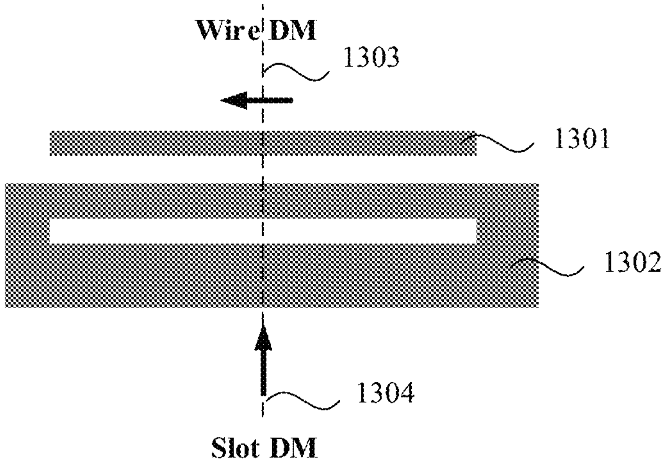
FIG. 13 illustrates an antenna structure includes a DM wire antenna element and a DM slot antenna element pair in accordance with an embodiment.

An example antenna structure of the third set is illustrated in FIG. 5 as the combination of the DM wire antenna element 502 and the DM slot antenna element 504. This antenna structure in accordance with an embodiment is shown in FIG. 13. The first antenna element is a DM wire antenna element 1301 which is fed asymmetrically. The second antenna element is a DM slot antenna element 1302 which is fed asymmetrically. The first antenna element is in the same orientation as the second antenna element. In other words, their longitudinal axes are parallel. Thus, the radiation patterns of the first and second antenna elements are polarised in orthogonal directions.

Suitably, the first antenna element 1301 is aligned with the second antenna element 1302. The first antenna element 1301 has a central axis 1303. The second antenna element 1302 has a central axis 1304. The central axis 1303 of the first antenna element 1301 is aligned with the central axis 1304 of the second antenna element 1302. The central axis of each antenna element may bisect that antenna element. In FIG. 13, the central axis of each antenna element is perpendicular to the longitudinal axis of that antenna element. The antenna element may be symmetrical about its central axis. In particular, the central axis may be an axis of reflection for the antenna element. The first and second antenna elements may have the same longitudinal extent. Thus, as well as the central axes of the antenna elements being aligned, the ends of the antenna elements may be aligned.

Figure 14:
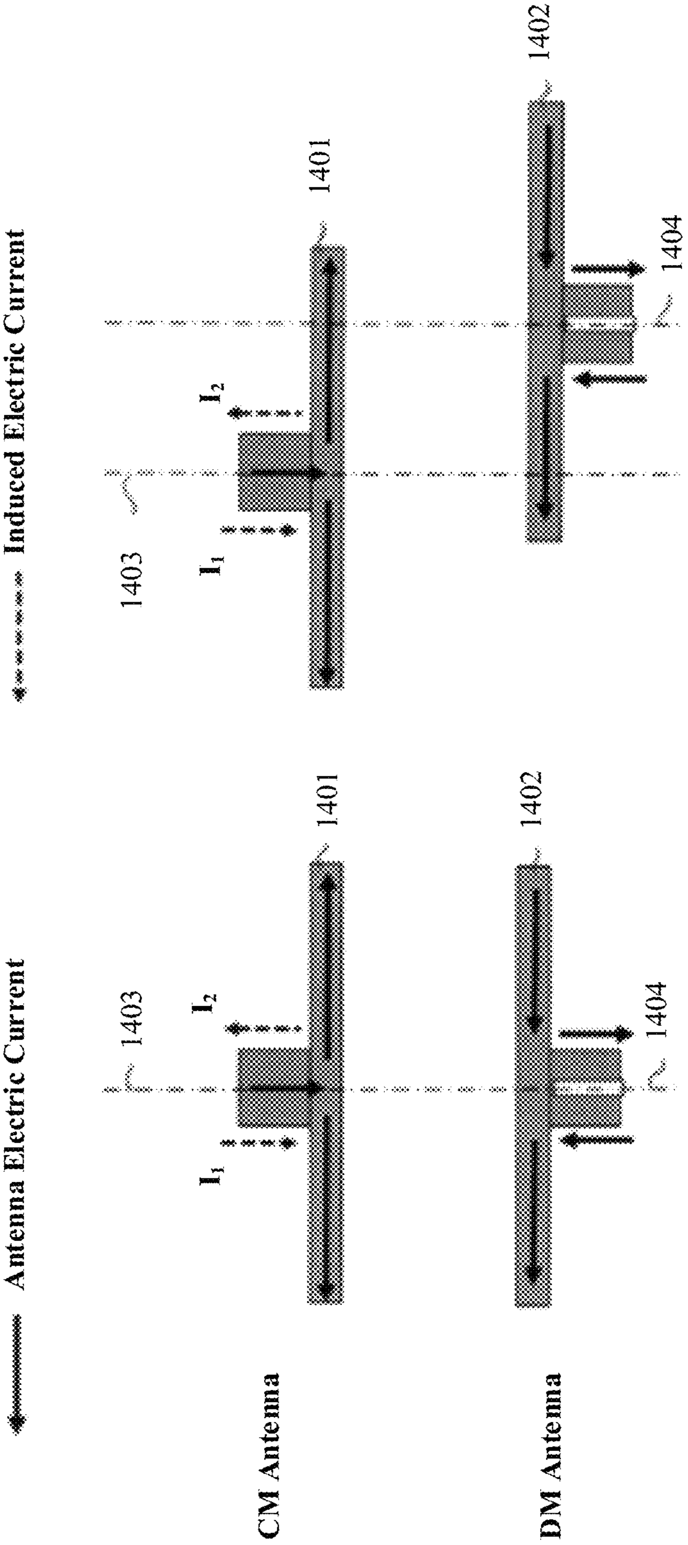
FIG. 14 illustrates a symmetrical and an asymmetrical layout for wire antenna elements of an antenna structure in accordance with an embodiment.
Figure 15:
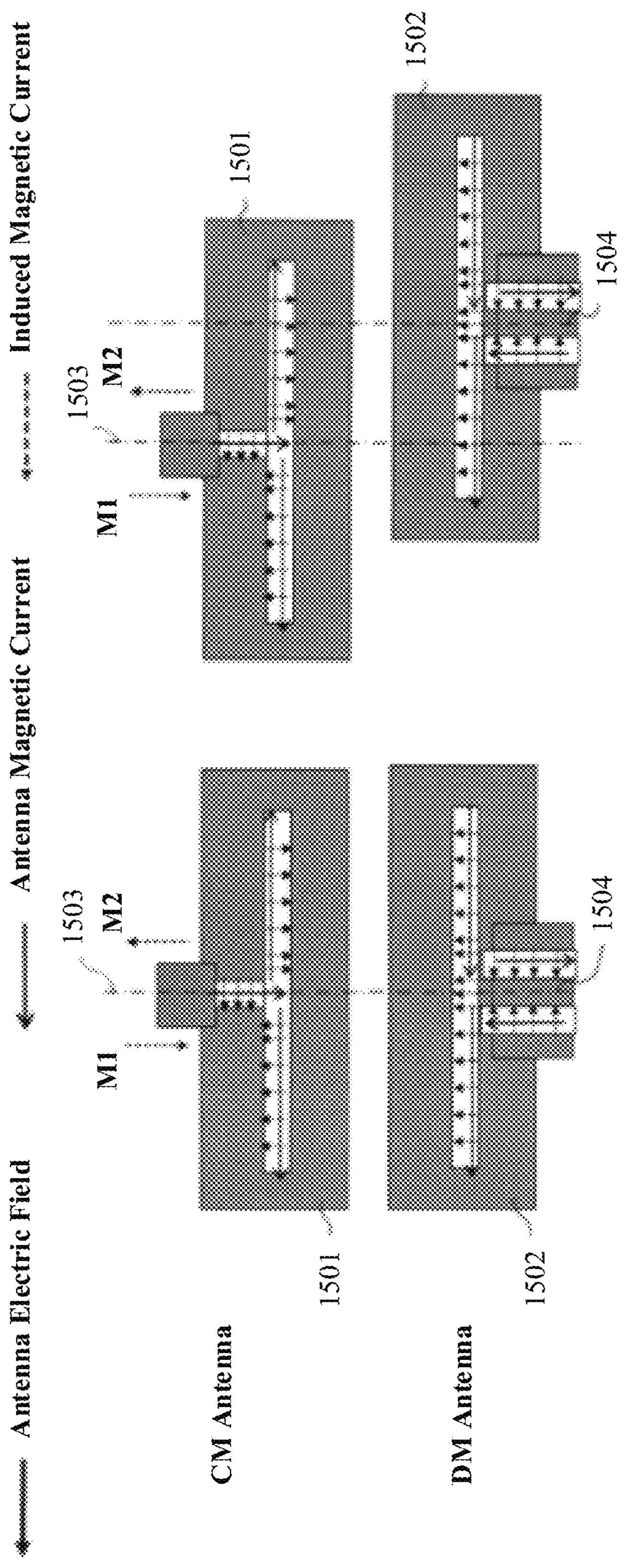
FIG. 15 illustrates a symmetrical and an asymmetrical layout for slot antenna elements of an antenna structure in accordance with an embodiment.

FIGS. 14 and 15 illustrate how aligning the central axes of the pair of antenna elements of an antenna structure aids isolation between the antenna elements in accordance with an embodiment. FIGS. 14*a* and 14*b* illustrate an antenna structure having a pair of wire antenna elements 1401 and 1402, one operating in a CM and the other operating in a DM. In FIG. 14*a*, the central axis 1403 of the CM wire antenna element 1401 is aligned with the central axis 1404 of the DM wire antenna element 1402. Electric current $I_1$ is induced at the CM wire antenna element 1401 by the left hand side of the DM wire antenna element 1402. Electric current $I_2$ is induced at the CM wire antenna element 1401 by the right hand side of the DM wire antenna element 1402. Due to the symmetrical layout of the two antenna elements, $I_1=-I_2$. In other words, the amplitude of $I_1$ is the same as the amplitude of $I_2$, and the phase difference between $I_1$ and $I_2$ is 180°. The induced electric currents $I_1$ and $I_2$ at the CM wire antenna element therefore cancel each other out at the port. Hence high isolation between the two antenna elements 1401 and 1402 is achieved.

In FIG. 14*b*, the wire antenna elements 1401 and 1402 have central axes 1403 and 1404 which are offset. The central axes 1403 and 1404 are parallel but not aligned. Thus, the wire antenna elements 1401 and 1402 are in the same orientation as each other but offset along their longitudinal axes. Due to the asymmetrical layout of the two antenna elements, the path loss and phase delay of the two induced electric currents at the CM antenna element is different, and hence $I_1\neq-I_2$. Thus, poorer isolation is achieved between the antenna elements of FIG. 14*b* than those of FIG. 14*a*.

FIGS. 15*a* and 15*b* illustrate an antenna structure having a pair of slot antenna elements 1501, 1502, one operating in a CM and the other operating in a DM. In FIG. 15*a*, the central axis 1503 of the CM slot antenna element 1503 is aligned with the central axis 1504 of the DM slot antenna element 1502. Magnetic current $M_1$ is induced at the CM slot antenna element 1501 by the left hand side of the DM slot antenna element 1502. Magnetic current $M_2$ is induced at the CM slot antenna element 1501 by the right hand side of the DM slot antenna element 1502. Due to the symmetrical layout of the two antenna elements, $M_1=-M_2$. In other words, the amplitude of $M_1$ is the same as the amplitude of $M_2$, and the phase difference between $M_1$ and $M_2$ is 180°. The induced magnetic currents $M_1$ and $M_2$ at the CM slot antenna element therefore cancel each other out at the port. Hence high isolation between the two antenna elements 1501 and 1502 is achieved.

In FIG. 15*b*, the slot antenna elements 1501 and 1502 have central axes 1503 and 1504 which are offset. The central axes 1503 and 1504 are parallel but not aligned. Thus, the slot antenna elements 1501 and 1502 are in the same orientation as each other but offset along their longitudinal axes. Due to the asymmetrical layout of the two antenna elements, the path loss and phase delay of the two induced magnetic currents at the CM antenna element is different, and hence $M_1\neq-M_2$. Thus, poorer isolation is achieved between the antenna elements of FIG. 15*b* than those of FIG. 15*a*.

The antenna structures described herein may be sized to operate in any frequency range, including mm-Wave frequency bands. For example, the antenna structures may be sized to resonate in the 3G and 4G frequency ranges of 700 MHz to 3 GHz for transceiving cellular signals. The antenna structures may be sized to resonate in the 3G, 4G and 5G frequency ranges of 700 MHz to 6 GHz and 30 GHz for transceiving cellular signals. The longitudinal length of the antenna elements may be adapted at manufacture to cause them to resonate at the desired frequency ranges. For example, the antenna elements can be reduced in length to cause them to have higher resonant frequencies. The antenna elements can be increased in length to cause them to have lower resonant frequencies. As an example, a unit antenna element of the types described herein having longitudinal length of 2.5 mm will have a resonant frequency of approximately 30 GHz, whereas a unit antenna having a longitudinal length of 70-80 mm will cause the antenna element to resonate in the 1-2 GHz range.

The antenna elements of the antenna structures described herein are sufficiently highly isolated by virtue of their radiation patterns being polarised in orthogonal directions that although they are physically co-located, they are able to independently transceive separate signals at the same frequency. This is particularly useful for devices for which it is desirable to transceive two different signals simultaneously at the same frequency. For example, in cellular devices which transceive using Bluetooth and WiFi signals simultaneously, both of which operate at 2.45 GHz.

The antenna elements described herein may be fabricated from metal strips or wire. The ground plane may be fabricated from a large piece of metal, such as copper, on a PCB board.

The antenna elements described herein may be fabricated over multiple layers. The feedlines described herein may be fabricated over multiple layers. The antenna structure as a whole may be a planar structure. Alternatively, the antenna structure may have a three-dimensional profile. For example, the antenna elements may be a planar structure with the feedlines of one or more of the ports extending out from that planar structure. The antenna elements themselves may have a three-dimensional profile. This may enable the antenna structure to fit into the shape of the available volume in, for example, the mobile phone or tablet into which the antenna structure is incorporated.

The antenna structures described can be used in a range of devices, such as mobile phones, tablets, base stations, radars or antennas mounted on airplanes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that embodiments may any individual feature and/or combination of features. In view of the foregoing description it will be evident to a person skilled in the art that various modifications may be made within departing from embodiments disclosed herein.

The invention claimed is:

1. An antenna structure comprising:
- a first antenna element connected to a first port; and
- a second antenna element connected to a second port;
- wherein one of the first antenna element and the second antenna element is a slot antenna element, the other one of the first antenna element and the second antenna element is a slot antenna element or a wire antenna element;
- the antenna structure is operable to simultaneously transceive:
  - a first signal via electric or magnetic current flow through the first antenna element to or from the first port, wherein the first antenna element operates in a symmetrically excited mode in which current flows symmetrically through the first antenna element and/or an asymmetrically excited mode in which current flows asymmetrically through the first antenna element, thereby causing the first antenna element to resonate at a first resonant frequency, and
  - a second signal via electric or magnetic current flow through the second antenna element to or from the second port, wherein the second antenna element operates in a symmetrically excited mode in which current flows symmetrically through the second antenna element and/or an asymmetrically excited mode in which current flows asymmetrically through the second antenna element, thereby causing the second antenna element to resonate at a second resonant frequency, wherein the first resonant frequency is the same as the second resonant frequency.

2. The antenna structure of claim 1, wherein the first antenna element comprises a one-dimensional antenna element, and/or the second antenna element comprises a one-dimensional antenna element.

3. The antenna structure of claim 1, wherein the first antenna element is operable in a symmetrically excited mode in which it emits a field polarized in a first direction to transceive the first signal, and the second antenna element is operable in an asymmetrical excited mode in which it emits a field polarized in a second direction orthogonal to the first direction to transceive the second signal.

4. The antenna structure of claim 1, wherein the first antenna element is operable in a symmetrically excited mode in which it emits a field polarized in a first direction to transceive the first signal, and the second antenna element is operable in a symmetrical excited mode in which it emits a field polarized in a second direction orthogonal to the first direction to transceive the second signal.

5. The antenna structure of claim 1, wherein the first antenna element is operable in an asymmetrically excited mode in which it emits a field polarized in a first direction to transceive the first signal, and the second antenna element is operable in an asymmetrical excited mode in which it emits a field polarized in a second direction orthogonal to the first direction to transceive the second signal.

6. The antenna structure of claim 1, wherein the first antenna element has a central axis and the second antenna element has a central axis, the central axis of the first antenna element is aligned with the central axis of the second antenna element.

7. The antenna structure of claim 1, wherein the first antenna element has a central axis and the second antenna element has a central axis, the central axis of the first antenna element is offset from the central axis of the second antenna element.

8. The antenna structure of claim 1, wherein the first antenna element is in a same orientation as the second antenna element.

9. The antenna structure of claim 1, wherein the first antenna element is in an orthogonal orientation to the second antenna element.

10. A method of operating an antenna structure comprising a first antenna element connected to a first port, and a second antenna element connected to a second port, one of the first antenna element and the second antenna element is a slot antenna element, the other one of the first antenna element and the second antenna element is a slot antenna element or a wire antenna element, the method comprising:
- simultaneously transceiving:
  - a first signal via electric or magnetic current flow through the first antenna element to or from the first port, wherein the first antenna element operates in a symmetrically excited mode in which current flows symmetrically through the first antenna element and/or an asymmetrically excited mode in which current flows asymmetrically through the first antenna element, thereby causing the first antenna element to resonate at a first resonant frequency; and a second signal via electric or magnetic current flow through the second antenna element to or from the second port, wherein the second antenna element operates in a symmetrically excited mode in which current flows symmetrically through the second antenna element and/or an asymmetrically excited mode in which current flows asymmetrically through the second antenna element, thereby causing the second antenna element to resonate at a second resonant frequency, wherein the first resonant frequency is the same as the second resonant frequency.

11. The method of claim 10, wherein the first antenna element comprises a one-dimensional antenna element, and/or the second antenna element comprises a one-dimensional antenna element.

12. The method of claim 10, wherein the first antenna element is operable in a symmetrically excited mode in which it emits a field polarized in a first direction to transceive the first signal, and the second antenna element is operable in an asymmetrical excited mode in which it emits a field polarized in a second direction orthogonal to the first direction to transceive the second signal.

13. The method of claim 10, wherein the first antenna element is operable in a symmetrically excited mode in which it emits a field polarized in a first direction to transceive the first signal, and the second antenna element is operable in an symmetrical excited mode in which it emits a field polarized in a second direction orthogonal to the first direction to transceive the second signal.

14. The method of claim 10, wherein the first antenna element is operable in an asymmetrically excited mode in which it emits a field polarized in a first direction to transceive the first signal, and the second antenna element is operable in an asymmetrical excited mode in which it emits a field polarized in a second direction orthogonal to the first direction to transceive the second signal.

15. The method of claim 10, wherein the first antenna element has a central axis and the second antenna element has a central axis, the central axis of the first antenna element is aligned with the central axis of the second antenna element.

16. The method of claim 10, wherein the first antenna element has a central axis and the second antenna element has a central axis, the central axis of the first antenna element is offset from the central axis of the second antenna element.

17. The method of claim 10, wherein the first antenna element is in a same orientation as the second antenna element.

18. The method of claim 10, wherein the first antenna element is in an orthogonal orientation to the second antenna element.

19. A method comprising:

operating an antenna structure comprising a first antenna element connected to a first port, and a second antenna element connected to a second port, one of the first antenna element and the second antenna element is a slot antenna element, the other one of the first antenna element and the second antenna element is a slot antenna element or a wire antenna element, wherein operating the antenna structure comprises simultaneously transceiving:

a first signal via electric or magnetic current flow through the first antenna element to or from the first port, wherein the first antenna element resonates at a first resonant frequency; and a second signal via electric or magnetic current flow through the second antenna element to or from the second port, wherein the second antenna element resonates at a second resonant frequency, wherein the first resonant frequency is the same as the second resonant frequency.

* * * * *